(12) United States Patent
Harford

(10) Patent No.: US 6,728,089 B2
(45) Date of Patent: Apr. 27, 2004

(54) SURGE SUPPRESSOR FOR WIDE RANGE OF INPUT VOLTAGES

(76) Inventor: Jack R. Harford, 11 Harmony School Rd., Flemington, NJ (US) 08822

(*) Notice: Subject to any disclaimer, the term of this patent is extended or adjusted under 35 U.S.C. 154(b) by 136 days.

(21) Appl. No.: 10/040,704

(22) Filed: Nov. 1, 2001

(65) Prior Publication Data

US 2003/0086234 A1 May 8, 2003

(51) Int. Cl.$^7$ ................................................. H02H 1/00
(52) U.S. Cl. ........................................ 361/113; 361/111
(58) Field of Search ............................ 361/54, 56, 91, 361/111, 113, 119; 363/50, 51, 53, 58

(56) References Cited

U.S. PATENT DOCUMENTS

| | | | |
|---|---|---|---|
| 4,034,268 A | * 7/1977 | Klauck | 361/111 |
| 4,491,903 A | * 1/1985 | Montague | 363/48 |
| 4,870,528 A | 9/1989 | Harford | |
| 4,870,534 A | 9/1989 | Harford | |
| 5,414,609 A | * 5/1995 | Levran et al. | 363/17 |
| 5,610,793 A | 3/1997 | Luu | |
| 6,226,162 B1 | 5/2001 | Kladar et al. | |
| 6,233,343 B1 | * 5/2001 | Muranami et al. | 381/96 |
| 6,288,883 B1 | * 9/2001 | Chen | 361/58 |
| 6,291,944 B1 | * 9/2001 | Hesterman et al. | 315/224 |

* cited by examiner

Primary Examiner—Jonathan Salata
(74) Attorney, Agent, or Firm—Kenneth P. Glynn, Esq.

(57) ABSTRACT

The present invention is directed to a wide input voltage range surge suppressor. It includes a series circuit for attachment to an upstream AC power input, and to a downstream load. There is a nonlinear low pass L-C filter having an inductor (and in some preferred embodiments, a low Q linear inductor) and a diode bridge, wherein the diode bridge includes at least one large value capacitor. There are two or three electrolytic capacitors of the nonlinear low pass L-C filter diode bridge in preferred embodiments. There is also a two section high pass filter connected to the electrolytic capacitor. This two section high pass filter has at least two diversely rated capacitors and at least three diversely rated resistors. A voltage offset diode is connected to the two section high pass filter and at least one electronic switch is connected to the voltage offset diode, with at least one capacitor connected to the electronic switch. The electronic switch is preferably a silicon controlled rectifier (SCR) switch. In some preferred embodiments of the present invention, wide input voltage range surge suppressor there is at least one capacitor connected to the electronic switch and it is at least one electrolytic capacitor of the nonlinear low pass L-C filter diode bridge. In addition to the foregoing, the present invention wide input voltage range surge suppressor electronic switch includes at least one series resistor for current drive balance assurance.

20 Claims, 5 Drawing Sheets

SURGE SUPPRESSOR FOR WIDE RANGE OF INPUT VOLTAGES

BACKGROUND OF THE INVENTION

1. Field of the Invention

The present invention relates to power line surge suppressors and, more specifically, to surge suppressors which are responsive to a wide input voltage range, e.g., in a range of less than 100 volts to higher than 250 volts.

2. Information Disclosure Statement

Electric and electronic loads receiving power from an external grid is sometimes subjected to high voltage surges. Such surges may arise from inductive loads, lightning strikes or other phenomenon, and may cause damage to or even destroy electric and electronic equipment and devices.

The highest potential transient spike voltages are short in duration, typically tens of microseconds. These high potential strikes may have voltages in the ranges of many thousands of volts, at currents of many thousands of amperes. Such high voltages tend to overstress electronic equipment, components, motors, etc. creating unwanted and hazardous conditions. The high potentials and high current flow cause such drastic stress that permanent damage or destruction results.

In response to these problems, power main frequency isolation transformers in DC power supplies were utilized to obtain energy from the AC power main to isolate power main voltage from the loads for surge protection. However, these devices were costly, large and heavy. In the alternative, to reduce costs, weight and size, switched-mode voltage regulators have been utilized, but these are not fully reliable and may themselves be damaged by high potential surges. Line surge suppressors have also been utilized but have been unreliable when subjected to lightning storm strikes.

U.S. Pat. No. 6,226,162 describes a surge suppression network for single phase and multiphase AC systems which has a voltage clamping device connected in series with a gated crowbar device across the supply voltage in parallel with the load to be protected. A trigger circuit gates the crowbar device on in response to a specified rate of change of the supply voltage indicative of a surge. For higher levels of surge current shunting, pluralities of clamping devices and crowbar devices can be connected in parallel with a single trigger circuit simultaneously turning on all of the crowbar devices for each phase. For crowbar devices such as TRIACs with different response characteristics to positive and negative surges and for unipolar devices such as SCRs, positive and negative subnetworks are connected in antiparallel across the load.

U.S. Pat. No. 5,610,793 describes a three-stage surge protection circuit. The surge protection circuit includes input terminals for connection to an electrical power supply system and output terminals for connection to equipment to be protected. The three stages comprise: a surge dissipation stage coupled to the input terminals for storing and dissipating transient surge energy across the input terminals; a current limiting stage comprising a pair of inductors, each of which is coupled in series to a respective conductor from said input terminals, for limiting current surges; and a voltage clamping stage comprising an avalanche diode for accurately clamping the voltage to be supplied to the protected electrical equipment to a predetermined level. The surge protection circuit of the present invention can also be provided in a configuration for protecting electrical equipment powered by a three conductor and/or three-phase power system.

U.S. Pat. No. 4,870,534 to the same inventor herein describes a surge suppressor for repeatedly protecting a load against surges occurring on AC power mains from lightning surges or the like. It comprises a first series circuit having a first inductance and a first alternating voltage limiter, including at least a first capacitance and a bidirectionally conductive rectifier circuit, coupled between first and second input terminals. The first inductance conducts substantially all of the current supplied from the A-C power mains. A second series circuit comprising a second inductance and second alternating voltage limiter, including at least a second capacitance and a second bidirectionally conductive rectifier circuit, is coupled across the first alternating voltage limiter and is coupled to first and second output terminals. The first series circuit is arranged for limiting surge currents and voltage excursions passed to the second series circuit to first levels while the second series circuit is arranged for further limiting surge currents and voltage excursions passed to the output terminals to second levels less than first levels.

U.S. Pat. No. 4,870,528 to the same inventor herein describes a surge suppressor which comprises a first series circuit having a first inductance and a first alternating voltage limiter, including at least a first capacitance and a bidirectionally conductive rectifying circuit for charging the first capacitance, coupled between first and second input terminals for limiting surge currents and voltage excursions coupled to first and second load output terminals. The first alternating voltage limiter further comprises a sensing circuit for sensing at least one of the charging current supplied to and the voltage developed across the first capacitance. An auxiliary energy storage circuit and a normally open switching device responsive to the sensing circuit are provided for coupling the auxiliary energy storage circuit across the first capacitance during high energy surge conditions.

Notwithstanding the prior art, the present invention is neither taught nor rendered obvious thereby.

SUMMARY OF THE INVENTION

The present invention is directed to a wide input voltage range surge suppressor device. It includes a series circuit means, with a plurality of components, for installation between an AC power input and a downstream load. These components include a nonlinear low pass L-C filter having an inductor and a diode bridge, wherein the diode bridge includes at least one large value capacitor, said filter adapted for attachment to an AC power input. There are two electrolytic capacitors of the nonlinear low pass L-C filter diode bridge in preferred embodiments. These electrolytic capacitor(s) have a rating within the range of about 50 microfarads to about 400 microfarads. The low pass L-C filter diode bridge rectifier diodes are generally rated in the range of about 3 amps, 400 volts to about 6 amps, 800 volts.

There is a two section high pass filter connected to the electrolytic capacitor. This high pass filter has at least two capacitors, preferably diversely rated, and at least three resistors, preferably diversely rated. The two section high pass filter includes at least one capacitor having a rating within the range of about 0.05 microfarads to about 0.5 microfarads, and at least a second capacitor having a rating within the range of about 0.1 microfarads to about 1.0 microfarads. Preferably, the two section high pass filter includes a resistor having a rating within the range of about 100 ohms to about 400 ohms, and at least a second resistor having a rating within the range of about 20 ohms to about 200 ohms, and at least a third resistor having a rating within the range of about 10 ohms to about 200 ohms.

An optional, but preferred voltage offset diode is connected to the two section high pass filter and at least one electronic switch is connected to the voltage offset diode, with at least one capacitor connected to the electronic switch. The electronic switch is preferably a silicon controlled rectifier (SCR) switch In preferred embodiments of the present invention wide input voltage range surge suppressor there is at least one capacitor connected to the electronic switch and it is at least one electrolytic capacitor of the nonlinear low pass L-C filter diode bridge.

In addition to the foregoing, the present invention wide input voltage range surge suppressor electronic switch includes at least one series resistor for current drive balance assurance.

In some embodiments of the present invention, the capacitor(s) connected to the electronic switch is separate from the one electrolytic capacitor(s) of the nonlinear low pass L-C filter diode bridge and is contained within a separate bridge.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
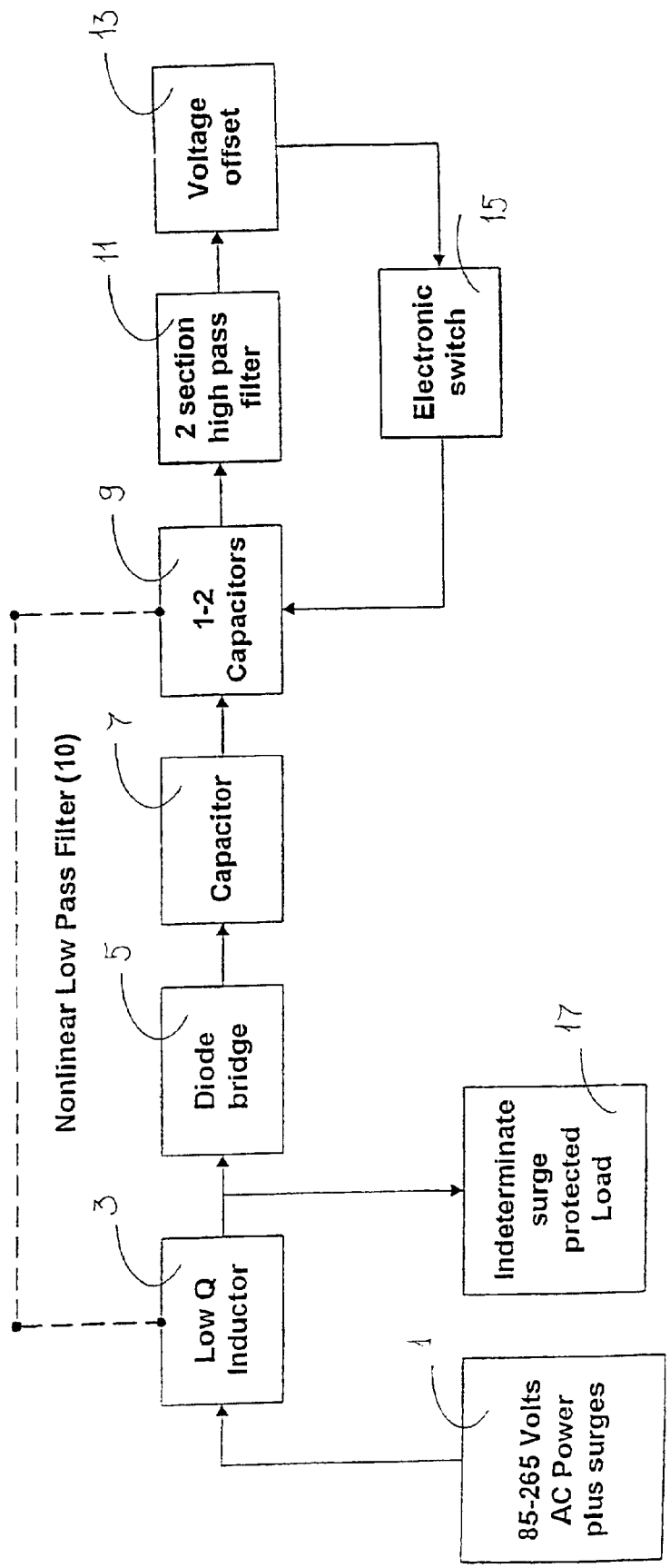
FIG. 1 illustrates a block diagram of the present invention showing the various functional components utilized therein.

Most electronic equipment is powered from "switch mode" power supplies. These power supplies generally take their power from the peak of the power wave, making them particularly susceptible to surges, which exceed the peak voltage of the power wave.

The present invention power line surge suppressor is directed to this problem and only permits an extremely small amount of surge energy through it to protected equipment, making it particularly effective for protecting such switch mode power supplies. Uniquely, in the present invention device, the low surge energy let-through is substantially independent of the absolute applied voltage, unlike fixed clamping level surge suppressors. An input voltage range of at least 3 to 1 is achieved with no surge performance degradation, making the present invention surge suppressor very effective in "brownout" and other wide input voltage range conditions.

Furthermore, the present invention device is not "sacrificial", that is, it does not "wear out" with use, giving products using this technology the benefit of very long life in extreme electrical environments.

Power line surges within a building may be as large as 6,000 Volts, 3,000 Amperes, with a duration of 50 microseconds, according to the industry standard ANSI C62.41. UL uses 6,000 Volts, 500 Amps for their UL1449 safety duty factor (endurance) testing, and for establishing their SVR (Suppressed Voltage Rating). Power line surge suppressors should serve the purpose of reducing such electrical surges to benign levels of voltage, current and duration (energy).

Most equipment today is powered from switch-mode power supplies. These supplies take their power from the peak of the power wave, where they present a very low impedance to said power wave during the peak period of the wave. This is important for understanding the significant advantages of the present invention device.

Three recent situations make conventional fixed voltage surge clamping products relatively ineffective in light of switch-mode supply characteristics.

First, utility companies lower their power line voltage during "brown-out" situations to conserve available electrical power. This voltage may be 108 Volts RMS (152 Volts peak), or even lower. Since fixed clamping level surge protection devices must be set to clamp at a voltage higher than the highest expected voltage (typically 10% above normal, or 132 Volts RMS, or 187 Volts peak), plus the clamping component tolerance, the typical clamping component is rated for 150 Volts RMS (212 Volts peak). With a 10% component tolerance, the clamping voltage would range from 135 to 165 Volts RMS (190 to 233 Volts peak). In the brown out scenario just described, the power line Voltage is 108 Volts RMS, and fixed clamping component is 165 Volts RMS, and, with the prior art surge suppressors, absolutely no surge suppression takes place until after a surge voltage increment of about 80 Volts peak! Such a large voltage increment before any surge suppression even starts, results in very large currents flowing into the "protected" power supply, damaging or putting these supplies under severe stress!

Second, During rolling blackouts, very large surges are created as the magnetic fields around all of the current carrying wires collapse. These wide area regions of multiple surges put significant stress on power supplies and surge components alike, making effective, reliable suppression increasingly important.

Third, some newer equipment is being designed to operate from voltages that vary from 85 Volts RMS to 265 Volts RMS. Fixed clamping components for surge protection of this equipment are virtually useless over this wide voltage range.

The present invention overcomes all of the foregoing shortcomings of the prior art fixed voltage surge protection devices.

The block diagram of FIG. 1 shows the components of the present invention device, which has the unique capability of operating from 85 Volts RMS to 265 Volts RMS with effective dynamic surge energy suppression throughout the operating voltage range.

The surge suppressor of the present invention includes a first non-linear low pass L-C filter (10) having a low Q linear inductor 3, diode bridge 5, and electrolytic capacitors 7 and 9 within the bridge. A capacitor 7 within the bridge 5 charges to the peak voltage of the power wave. The load on the capacitor 7 is small so that the peak voltage value is substantially maintained across the capacitor 7 during normal operation. Under normal operation (no significant surge or brown out), the filtering action of the inductor 3 and capacitor 7 are minimal, since the filter capacitor 7 maintains its charge and has no impact on the power signal due to the peak detection action of the diode bridge circuit 5.

In the event of a surge which exceeds the peak voltage on the capacitor 7, full L-C filtering action takes place since the capacitor 7 is now effectively in the circuit, the supply voltage having exceeded the capacitor voltage. This filtering action has the effect of integrating and slowing down the leading edge of the surge. Due to the integration nature of the capacitor 7, the incremental voltage change caused by the surge current is a measure of the surge energy in Joules (½ C$\Delta$V$^2$) passing through the inductor. The rate of change of this incremental voltage on the capacitor 7 is an indication of the surge current.

A two section high pass filter 11 is connected across the peak detecting capacitor to detect the rate of voltage to see if this rate of change is large enough to pose a potential risk. A large rate of change will pass readily through the two section high pass filter 11, while a low rate of change will not. An optional, but preferred, small voltage offset 13 (a diode) is subsequently used to prevent false triggering due to normal power voltage turn-on conditions. After differentiation of the surge voltage across the capacitor, the remaining voltage at the output of the high pass filter 11 is applied to one or more electronic switches 15 (SCRs), and if the voltage is large enough, the SCR(s) will conduct. The SCR(s) are used to connect uncharged capacitors also located within the same or another bridge, into the circuit, being effectively placed directly across the incoming surge, which has the effect of inverting the surge and reducing it to a benign level, due to the low impedance of the capacitors, thus protecting the load 17.

Figure 2:
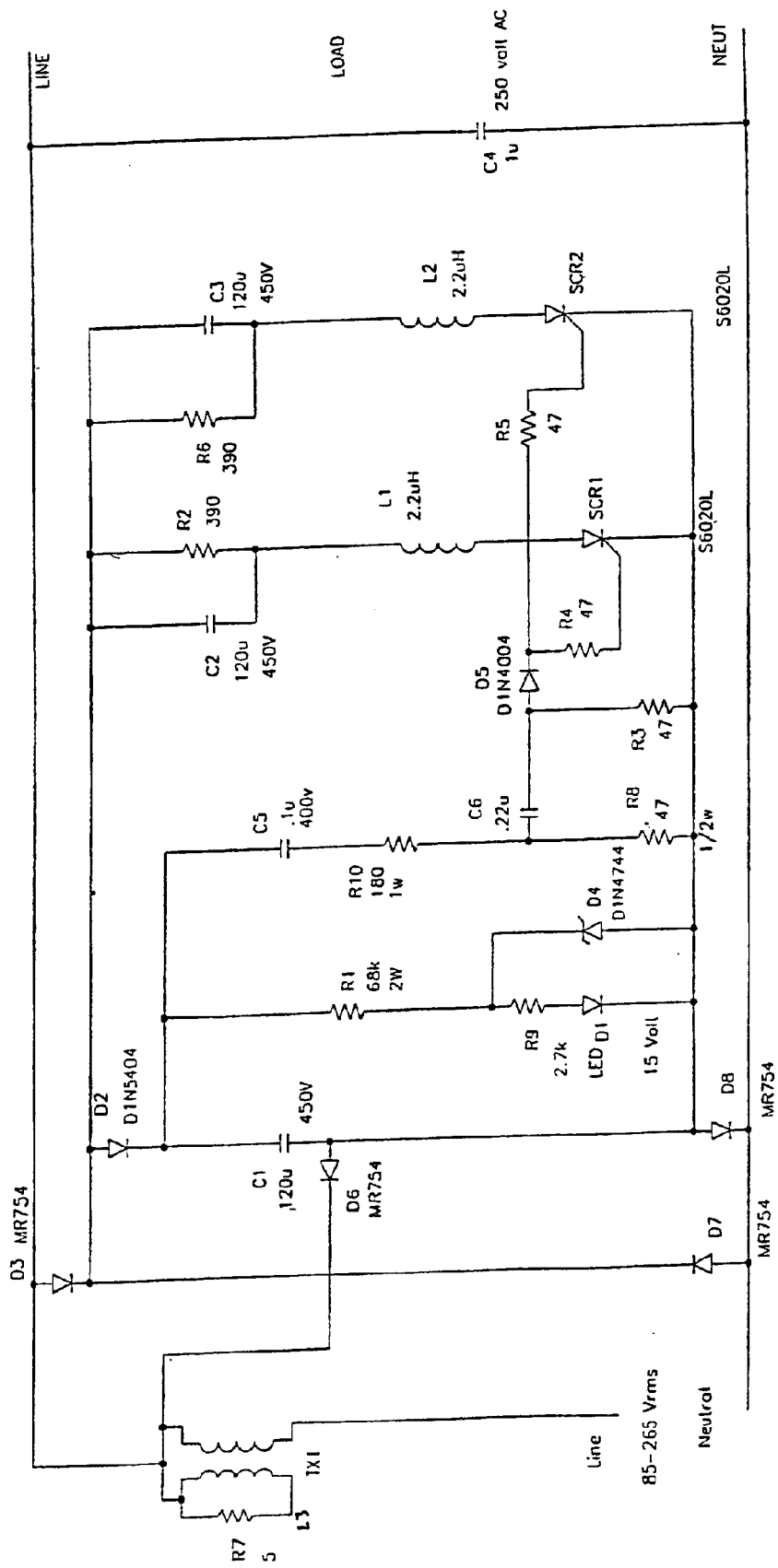
FIG. 2 shows a wiring diagram of one preferred embodiment of the present invention; and, FIGS. 3, 4 and 5 show test results of the present invention using the embodiment shown FIG. 2.

Referring to FIG. 2, a preferred embodiment wiring diagram is shown. Capacitor C1 is inside the diode bridge D3, D6, D7, D8. This capacitor will charge up to the peak of the power wave voltage, and maintain that voltage since R1 discharges very little of the voltage during each power wave cycle. Any voltage (such as a surge voltage) which exceeds the peak of the normal power wave voltage appears across C1 and is transferred to the high pass network consisting of C5, R10, R8, C6, R3. This two section high pass filter is selected to provide sufficient current to activate the SCRs, SCR1 and SCR2.

The SCRs in this example require up to 30 ma each to turn on. Since there may be an unbalance in their characteristics, series resistors R4 and R5 are used to assure balanced current drive to the SCRs. Assuming a 3 to 1 overdrive current (180 ma total), and driving from a low enough impedance to assure adequate drive current for faster turn-on, R10 may be established at about 200 Ohms for a surge inversion voltage of 100 Volts for a worst case 6,000 Volt surge. The values for each of the components shown in FIG. 2 are as follows:

| PART NO. | DESCRIPTION AND VALUE | |
|---|---|---|
| | Capacitors | |
| C1 | 120 mfd, | 450 volt |
| C2 | 120 mfd, | 450 volt |
| C3 | 120 mfd, | 450 volt |
| C4 | 1 mfd, | 250 volt |
| C5 | 0.1 mfd, | 400 volt |
| C6 | 0.22 mfd, | 50 volt |
| | Diodes | |
| D1 | LED | |
| D2 | 3 amp, | 400 volt rectifier diode |
| D3 | 6 amp, | 800 volt rectifier diode |
| D4 | 15 volt, | 1 watt Zener diode |
| D5 | 1 amp, | 400 volt rectifier diode |
| D6 | 6 amp, | 800 volt rectifier diode |
| D7 | 6 amp, | 800 volt rectifier diode |
| D8 | 6 amp, | 800 volt rectifier diode |
| | Inductors | |
| L1 | 2.2 microhenry | |
| L2 | 2.2 microhenry | |
| L3 | 100 microhenry | |

| PART NO. | DESCRIPTION AND VALUE | |
|---|---|---|
| | -continued | |
| | Resistors | |
| R1 | 68k, | 2 watt |
| R2 | 390 ohm, | 5 watt |
| R3 | 47 ohm | |
| R4 | 47 ohm | |
| R5 | 47 ohm | |
| R6 | 390 ohm, | 5 watt |
| R7 | 5 ohm, | 5 watt |
| R8 | 47 ohm | |
| R9 | 2.7k | |
| R10 | 180 ohm, | 1 watt |
| | SCRs | |
| SCR1 | 20 amp, | 600 volt |
| SCR2 | 20 amp, | 600 volt |

Figure 3:
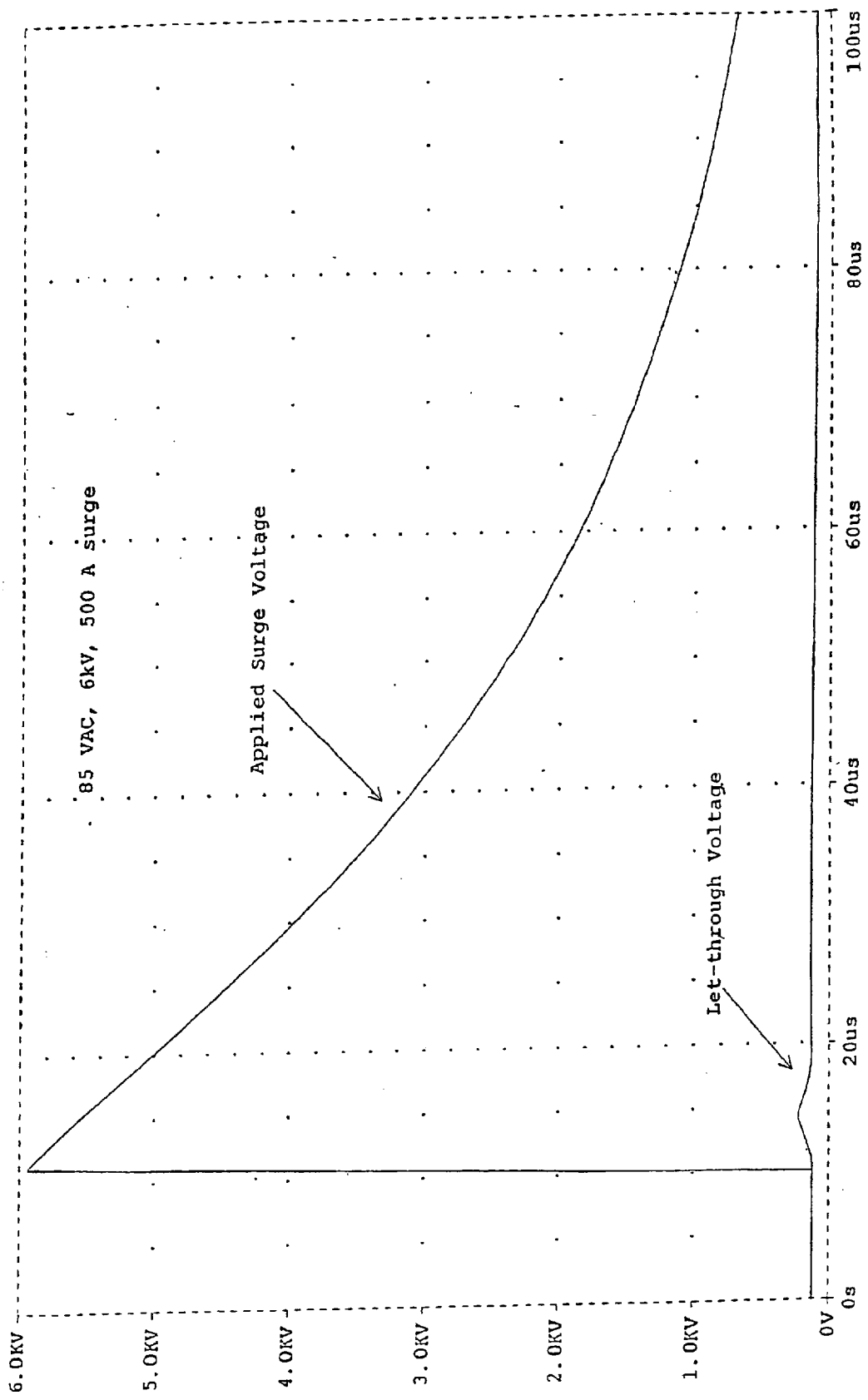
Figure 4:
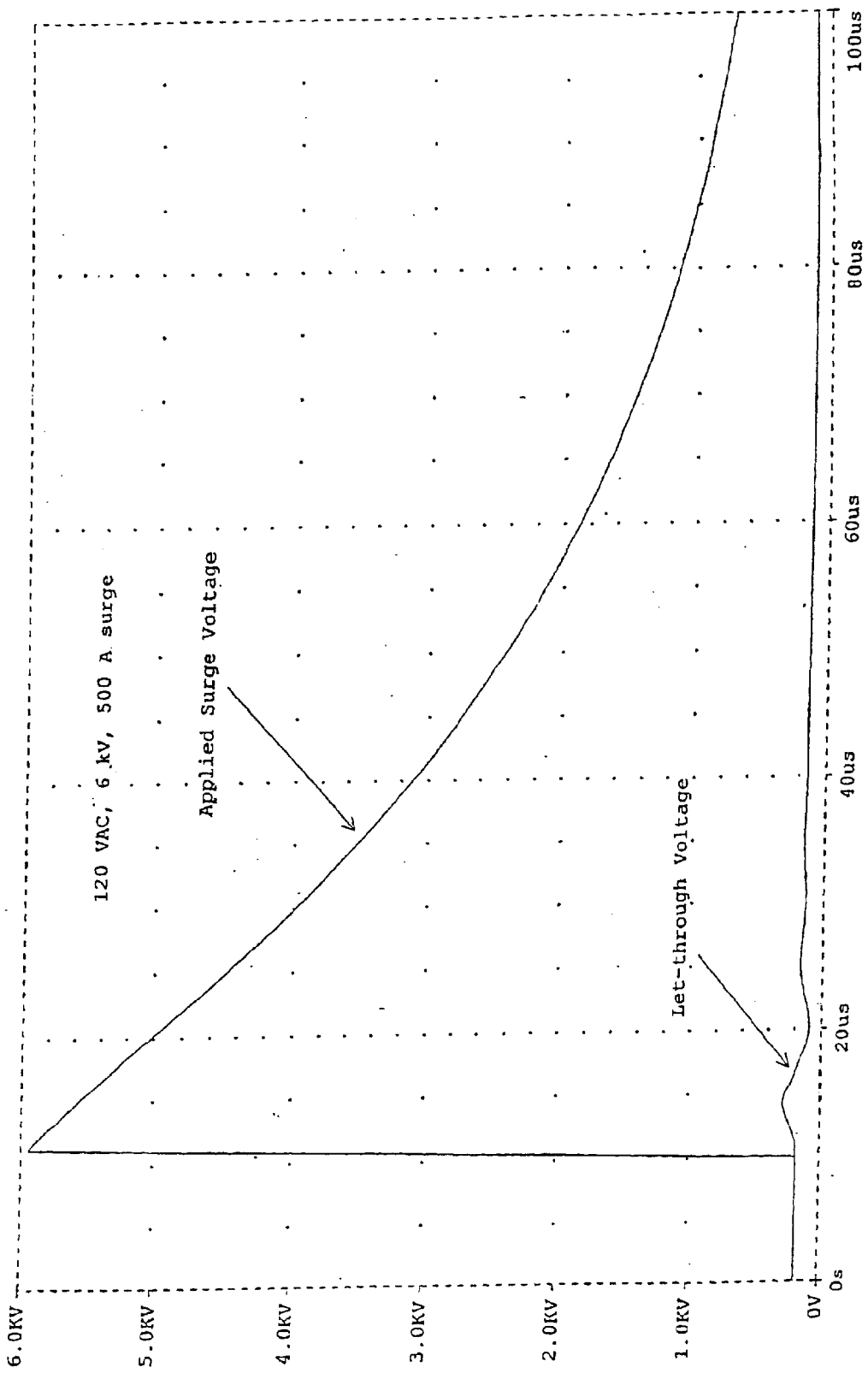
Figure 5:
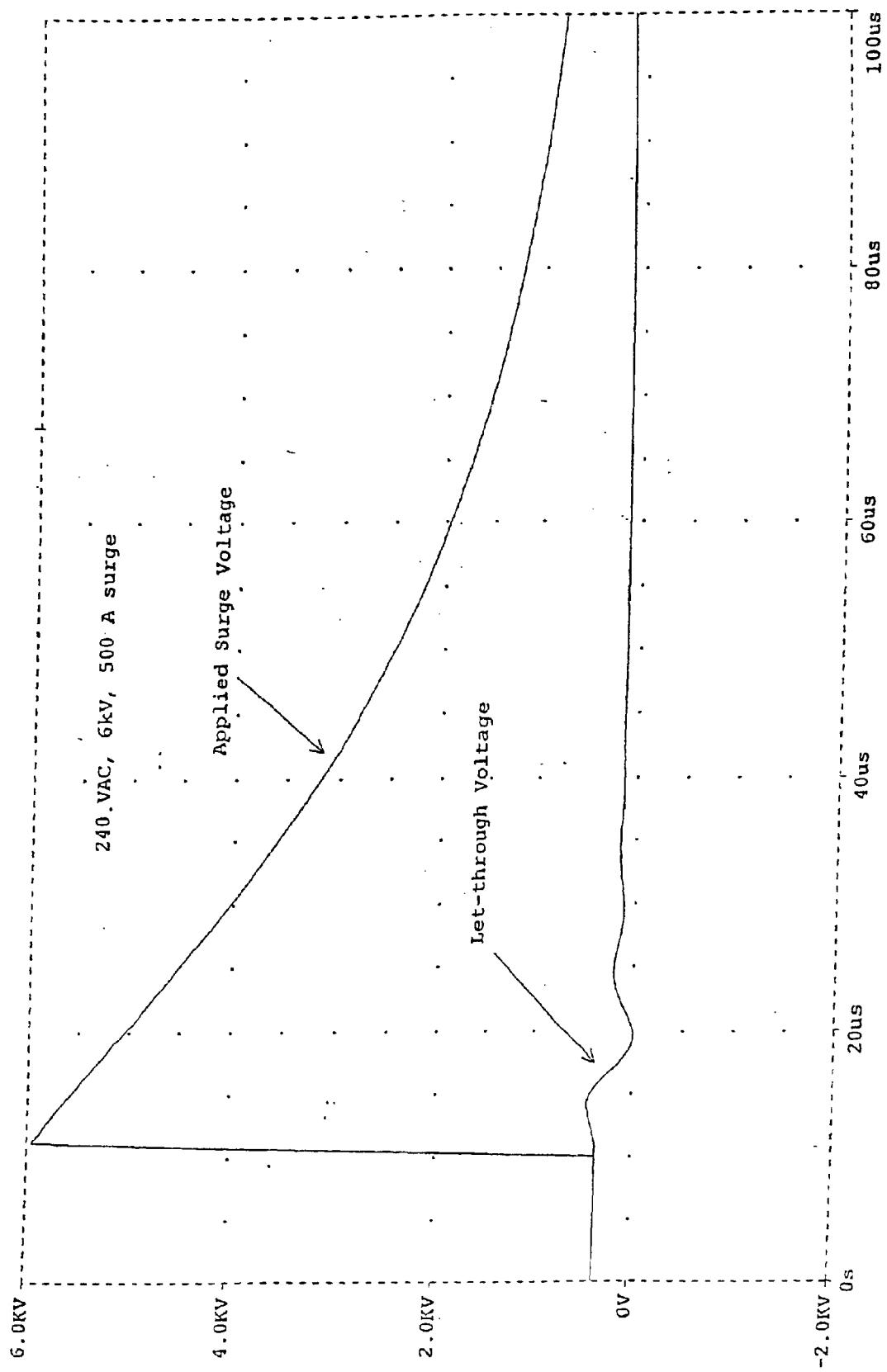

Utilizing the present invention device illustrated in FIG. 2 above, tests were made over a range of voltages with a 500 amp surge to show the efficacy of the present invention for varied voltages. FIGS. 3, 4 and 5 show the results.

In FIGS. 3, 4 and 5, respectively, waveforms are shown for 85 Volts RMS, 120 Volts RMS, and 240 Volts RMS, for a 6 kV, 500 amp surge. In each of these Figures, the applied surge voltage and the let-through voltage are plotted against time. In FIG. 3, the peak let-through voltage was about 0.25 kV, for FIG. 4, about 0.29 kV and for FIG. 5, about 0.46 kV, showing the consistent present invention surge suppression performance independent of the wide input voltage range. It can be seen that, while the incoming surge voltage exceeds the peak of the power wave for a period greater than 100 microseconds, the let-through voltage of this invention exceeds the peak voltage of the power wave for less than 6 microseconds in every case from 85 VAC to 240 VAC, thereby greatly diminishing the surge energy transferred to the protected load.

The essence of the present invention is the use of a L-C low pass input filter to act as an energy integrator and surge current limiter followed by a two section R-C filter. The two section high pass filter selects out surge energy levels large enough to do damage, while ignoring normal power line voltage conditions. When the surge energy levels are high enough, a semiconductor switching circuit is enabled to effectively invert surge energy before it can do any harm. Passive and active components are used which all operate within their transient ratings, so no degradation takes place during a surge, and the circuit has no inherent failure mode (non-sacrificial).

This circuit is an improvement over prior art in that it eliminates controlling Zener diodes and, thus, eliminates circuitry that limited the voltage range of optimum protection. The improved circuit of the present invention device functions optimally and essentially independently of the supply voltage, giving it superior performance independent of brownouts and enabling optimum protection for wide input voltage range equipment using switch-mode power supplies.

Obviously, numerous modifications and variations of the present invention are possible in light of the above teachings. It is therefore understood that within the scope of the appended claims, the invention may be practiced otherwise than as specifically described herein, for example, the present invention suppressor could be employed in three phase applications.

What is claimed is:

1. A surge suppressor for a wide range of input voltages, which comprises:
   (a) a circuit means creating a circuit for connection to an upstream AC power input, and to a downstream load, and having the following components within said circuit:
   (b) a nonlinear low pass L-C filter having an inductor and a diode bridge in series with one another, wherein said diode bridge includes at least one electrolytic capacitor;
   (c) a two section high pass filter connected to said at least one electrolytic capacitor;
   (d) at least one electronic switch connected to said two section high pass filter; and
   (e) said at least one electrolytic capacitor connected to said two section high pass filter.

2. The surge suppressor for a wide range of input voltages of claim 1 which further includes a voltage offset diode connected to said two section high pass filter.

3. The surge suppressor for a wide range of input voltages of claim 1 wherein said at least one electronic switch includes at least one resistor in series with said switch for current drive balance assurance.

4. The surge suppressor for a wide range of input voltages of claim 1 wherein said nonlinear low pass L-C filter diode bridge includes two electrolytic capacitors.

5. The surge suppressor for a wide range of input voltages of claim 1 wherein said at least one electronic switch is a silicon controlled rectifier switch.

6. The surge suppressor for a wide range of input voltages of claim 1 wherein said at least one electrolytic capacitor of said nonlinear low pass L-C filter diode bridge has a rating within the range of about 50 microfarads to about 400 microfarads.

7. The surge suppressor for a wide range of input voltages of claim 1 wherein said nonlinear low pass L-C filter diode bridge has rectifier diodes in the range of about 3 amps, 440 volts to about 6 amps, 800 volts.

8. The surge suppressor for a wide range of input voltages of claim 1 wherein said two section high pass filter includes at least one capacitor having a rating within the range of about 0.05 microfarads to about 0.5 microfarads, and a second capacitor, said second capacitor having a rating within the range of about 0.1 microfarads to about 1.0 microfarads.

9. The surge suppressor for a wide range of input voltages of claim 8 wherein said two section high pass filter includes a resistor having a rating within the range of about 100 ohms to about 400 ohms, and a second resistor, said second resistor having a rating in the range of about 20 ohms to about 200 ohms.

10. The surge suppressor for a wide range of input voltages of claim 8 further wherein there is a capacitor connected to said electronic switch that is separate from said capacitor of said nonlinear low pass L-C filter.

11. A surge suppressor for a wide range of input voltages, which comprises:
    (a) a circuit means creating a circuit for connection to an upstream AC power input, and to a downstream load, and having the following components within said circuit:
    (b) a nonlinear low pass L-C filter having a low Q linear inductor and a diode bridge in series with one another, wherein said diode bridge includes at least one electrolytic capacitor, and said filter having means for connection to an AC power input,
    (c) a two section high pass filter connected to said at least one electrolytic capacitor, said two section high pass filter having two diversely rated capacitors and three diversely rated resistors;
    (d) a voltage offset diode connected to said two section high pass filter;
    (e) at least one electronic switch connected to said voltage offset diode of said two section high pass filter; and
    (f) at least one capacitor connected to said two section high pass filter.

12. The surge suppressor for a wide range of input voltages of claim 11 wherein said at least one capacitor connected to said electronic switch is said at least one electrolytic capacitor of said nonlinear low pass L-C filter diode bridge.

13. The surge suppressor for a wide range of input voltages of claim 11 wherein said at least one electronic switch includes at least one resistor in series with said switch for current drive balance assurance.

14. The surge suppressor for a wide range of input voltages of claim 11 wherein said nonlinear low pass L-C filter diode bridge includes two electrolytic capacitors.

15. The surge suppressor for a wide range of input voltages of claim 11 wherein said at least one electronic switch is a silicon controlled rectifier switch.

16. The surge suppressor for a wide range of input voltages of claim 11 wherein said at least one electrolytic capacitor of said nonlinear low pass L-C filter diode bridge has a rating within the range of about 50 microfarads to about 400 microfarads.

17. The surge suppressor for a wide range of input voltages of claim 11 wherein said nonlinear low pass L-C filter diode bridge has rectifier diodes in the range of about 3 amps, 440 volts to about 6 amps, 800 volts.

18. The surge suppressor for a wide range of input voltages of claim 11 wherein said two section high pass filter includes at least one capacitor having a rating within the range of about 0.05 microfarads to about 0.5 microfarads, and a second capacitor, said second capacitor having a rating within the range of about 0.1 microfarads to about 1.0 microfarads.

19. The surge suppressor for a wide range of input voltages of claim 18 wherein said two section high pass filter includes a resistor having a rating within the range of about 100 ohms to about 400 ohms, and a second resistor, said second resistor having a rating in the range of about 20 ohms to about 200 ohms.

20. The surge suppressor for a wide range of input voltages of claim 18 further wherein there is a capacitor connected to said electronic switch that is separate from said capacitor of said nonlinear low pass L-C filter.

* * * * *